United States Patent
Wenning

[11] Patent Number: 5,874,173
[45] Date of Patent: Feb. 23, 1999

[54] HEAT-CURING, SOLVENT-FREE ONE-COMPONENT ADHESIVES WHICH ARE BASED ON POLYURETHANES AND WHICH DO NOT GIVE OFF ELIMINATION PRODUCTS, A PROCESS FOR THEIR PREPARATION, AND THEIR USE

[75] Inventor: Andreas Wenning, Nottuln, Germany

[73] Assignee: Huels Aktiengesllschaft, Marl, Germany

[21] Appl. No.: 893,684

[22] Filed: Jul. 11, 1997

[30] Foreign Application Priority Data

Jul. 13, 1996 [DE] Germany ............... 196 328 327.2

[51] Int. Cl.⁶ .................................. C08G 18/80
[52] U.S. Cl. ................ 428/425.8; 528/45; 528/73; 528/52; 528/407; 528/905; 427/386; 427/388.1; 156/331.7
[58] Field of Search .................. 528/45, 73, 52, 528/407, 905; 428/425.8; 427/386, 388.1; 156/331.7

[56] References Cited

U.S. PATENT DOCUMENTS 3,494,888  2/1970  McElroy .
4,335,228  6/1982  Beitchman et al. .................... 525/45
5,100,995  3/1992  Munzmay et al. ..................... 528/45
5,410,011  4/1995  Konishi et al. ........................ 528/45

FOREIGN PATENT DOCUMENTS 669353  8/1995  European Pat. Off. .
669354  8/1995  European Pat. Off. .

*Primary Examiner*—Erma Cameron
*Attorney, Agent, or Firm*—Oblon, Spivak, McClelland, Maier & Neustadt, P.C.

[57] ABSTRACT

Heat-curing, solvent-free one-component adhesives which are based on polyurethanes and which do not give off elimination products, and which are derived from A) a hardener component consisting of polyaddition products containing hydroxyl and uretdione groups, B) a binder component comprising 1,2-epoxide compounds having more than one 1,2-epoxide group and one or more hydroxyl groups in the molecule, C) catalysts for polymerizing epoxide groups, optionally D) further hydroxyl-containing compounds and optionally E) auxiliaries and additives known from adhesives technology; a process for preparing these compounds and to their use as heat-curing, one-component, solvent-free, thermally stable and solvent-resistant polyurethane (PU) adhesives which do not give off elimination products.

20 Claims, No Drawings

HEAT-CURING, SOLVENT-FREE ONE-COMPONENT ADHESIVES WHICH ARE BASED ON POLYURETHANES AND WHICH DO NOT GIVE OFF ELIMINATION PRODUCTS, A PROCESS FOR THEIR PREPARATION, AND THEIR USE

BACKGROUND OF THE INVENTION

1. Field of the Invention:

The invention relates to the use of polyaddition products containing hydroxyl and uretdione groups to prepare solvent-free polyurethanes which do not give off elimination products, and to the one-component, heat-curable polyurethane (PU) adhesives prepared accordingly.

2. Discussion of the Background Art:

Polyurethane adhesives are generally notable for very good properties of adhesion to surfaces of a very wide range of materials, for resistance to solvents, plasticizers, fats, oils and water, and for the high flexibility of the adhesive films even at low temperatures. Owing to the great variety of polyurethane chemistry, the literature—see e.g. G. Habenicht, Kleben -Grundlagen, Technologie, Anwendungen (Bonding—principles, technology, applications) , Springer Verlag, Berlin, Heidelberg, New York, Tokyo, 1986—recognizes a number of different types of polyurethane adhesives. A distinction is made between one-component ("one-pack") and two-component ("two-pack") systems. Two-pack polyurethane adhesives are essentially characterized by polyisocyanates as hardeners and by predominantly oligomeric diols and/or polyols as resin. They have the advantage of presenting no great problems in terms of shelf life and that by a skillful choice and targeted reactivity of the monomers it is possible to formulate systems having different pot lives and adhesive-film-determining properties, for example strength, elasticity and resistance to chemicals. Owing to polyaddition reactions, these adhesives do not release any elimination products in the course of crosslinking.

The technical effort required when processing two-pack systems in terms of precise dosing and mixing of the components has led to the development of one-pack systems, which are easier to process. These contain isocyanato prepolymers which are prepared from polyols of relatively high molecular mass with a stoichiometric excess of polyisocyanate. Full curing takes place in most cases through moisture-induced crosslinking. For this reason, sufficient atmospheric humidity (at least 40% rel. humidity) in the processing areas is required. Consequently, these adhesives are of only limited usefulness for bonds where the parts to be joined are metallic or otherwise moisture-impermeable. Owing to the exclusion of moisture, the packaging of these one-pack adhesives during transportation and storage is critical.

A further development comprises the after-crosslinking polyurethane hot-melt adhesives (reactive hot melts) which following application from the melt provide, after cooling (physically setting), a spontaneous initial strength and subsequently react, under the action of further ambient atmospheric humidity on the remaining reactive isocyanate groups, to form the adhesive-film polymer.

In the case of the crosslinking reaction by means of moisture, the formation of carbon dioxide as a result of the breakdown of the unstable carbamic acid derivatives may be critical, especially when relatively thick adhesive films of relatively high viscosity are present and when the gas bubbles are enclosed in the adhesive film. Moreover, moisture-curing PU adhesives do not attain the strengths of two-pack PU adhesives.

An alternative to the moisture-curing systems is represented by one-pack heat-activatable PU adhesives. These consist of polyol resins and of polyisocyanates whose isocyanate groups are inhibited by so-called blocking agents. Elevated temperatures lead to cleavage of the hardener molecules, in the course of which the blocking agents are eliminated and the polymer is generated by polyurethane formation. Here too, a disadvantage is the formation of elimination products in the sense of the adverse effect this has on the adhesion properties. Moreover, the organic structure of some blocking agents renders them toxicologically unacceptable.

Polyurethanes are likewise employed as solvent-containing adhesive systems. In this case, a distinction may be made between physically setting and chemically reacting systems. Both systems possess high molecular mass hydroxy polyurethanes as polymers, while the chemically reacting systems additionally include a polyisocyanate as second component in the solvent system. In order to form the adhesive film, a process which may take place at normal or elevated temperature, it is necessary to remove the solvent.

However, the interests of environmental protection and adhesive technology make it desirable to provide adhesives which are free from emissions in the form of solvent or of elimination products, such as blocking agents.

The object on which the invention is based, therefore, was to develop new PU adhesives unhampered by the above-mentioned disadvantages of the prior art; in other words, they should be one-component systems free from blocking agents and solvents and should be able to be crosslinked thermally to form thermosets. Furthermore, subsequent to curing, the PU adhesives should exhibit bonds having very good temperature and solvent resistance properties.

This object has been achieved in accordance with the disclosed invention. The text below describes the novel resin/hardener mixture in which the curing agents are polyaddition products containing hydroxyl and uretdione groups. The hydroxyl-containing resins are crosslinked both by a urethane reaction and by polymerization of the epoxide groups.

SUMMARY OF THE INVENTION

The present invention therefore provides heat-curing, one-component, solvent-free polyurethanes which do not give off elimination products and which comprise A) a hardener component comprising polyaddition products containing hydroxyl and uretdione groups, B) a binder component comprising 1,2-epoxide compounds having more than one 1,2-epoxide group and one or more hydroxyl groups in the molecule, C) catalysts for polymerizing epoxide groups, optionally D) further hydroxyl-containing compounds and optionally E) auxiliaries and additives known from adhesives technology.

DETAILED DESCRIPTION OF THE INVENTION

The hardener component A) is obtainable by reacting (i) uretdiones based on polyisocyanates, based especially on aliphatic and/or cycloaliphatic diisocyanates having at least two free isocyanate groups, and (ii) isocyanate-reactive, difunctional and optionally monofunctional compounds, especially diols and/or chain extenders, and optionally monoalcohols or monoamines, where the polyaddition products which contain uretdione groups can be prepared either in a solvent or, in particular without solvent, the catalysts C) are cyclic amidines of the general formula

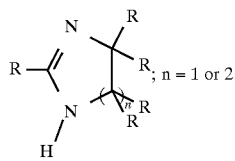

in which the radicals R are identical or different (cyclo) alkyls of 1 to 10 carbon atoms, aralkyls or aryls and where the content of cyclic amidine is from 1 to 10% by mass, preferably from 2 to 8% by mass, based on the sum of resin and hardener, and/or are polyisocyanates blocked with cyclic amidines, and the binder component D) comprises hydroxyl-containing compounds having a molecular mass of at least 60, an OH number of at least 20 mg of KOH/g and a hydroxyl functionality of at least 2.

Component D) is present in amounts of from 0 to 99% by mass, relative to component B). The mixing ratio of all hydroxyl-containing compounds and the polyaddition products containing hydroxyl and uretdione groups (crosslinkers) is generally chosen such that there are from 0.5 to 10, preferably from 0.8 to 5, OH groups per NCO group.

The invention additionally provides a process for preparing these heat-curing, one-component, solvent-free polyurethanes which do not give off elimination products and which comprise A) a hardener component comprising polyaddition products containing hydroxyl and uretdione groups, B) a binder component comprising 1,2-epoxide compounds having more than one 1,2-epoxide group and one or more hydroxyl groups in the molecule, C) catalysts for polymerizing epoxide groups, optionally D) further hydroxyl-containing compounds and optionally E) auxiliaries and additives known from adhesives technology, of the above-mentioned type.

The invention also provides for the use of the novel polyurethanes as heat-curing, one-component, solvent-free adhesives which do not give off elimination products, for the bonding of any desired heat-resistant substrates, especially for the bonding of metals.

The hardener component A) comprises polyaddition compounds which carry uretdione groups. The uretdione products, which in addition to the uretdiones may also contain up to 40% by mass of trimers and higher oligomers, are based on the reaction products of the dimerization of polyisocyanates, especially on the dimerization products of aliphatic and/or cycloaliphatic diisocyanates. Diisocyanates which are employed in particular are 1,6-diisocyanatohexane (HDI), 3-methyl-1,5-diisocyanatopentane (MPDI), 2,2,4-and 2,4,4-trimethyldiisocyanatohexane (TMDI), 1-isocyanato-3-isocyanatomethyl-3,5,5-trimethylcyclohexane (IPDI) and 4,4'-diisocyanatedicyclohexylmethane ($H_{12}$MDI) or any desired mixtures of these diisocyanates.

The preparation of polyaddition compounds of this kind containing uretdione groups by a reaction of uretdione-group-containing polyisocyanates with isocyanato-reactive, difunctional and optionally monofunctional compounds, especially diols and/or chain extenders, and also optionally monoalcohols or monoamines, is known in principle and is described, for example, in DE-C 24 20 475, DE-C 30 30 572, DE-C 30 30 588, DE-C 30 30 539, EP-B 0 669 353 and EP-B 0 669 354. The polyaddition compounds containing uretdione groups which are used as hardeners generally have an overall NCO content of from 3 to 26% (determined by heating the compounds at 180° C. for from 30 to 60 minutes). This "hot value" is a direct measure of the content of uretdione groups in the reaction product. The melting point of these compounds is generally in the range from 40° to 130° C.

The binder component B) comprises any desired aliphatic, cycloaliphatic, aromatic or heterocyclic compounds which carry at least two epoxide groups, i.e. preferably 1,2-epoxide groups, and which have one or more hydroxyl groups in the molecule.

The suitable hydroxyl-containing epoxy resins which are preferred as component B) have epoxide equivalent weights of from about 800 to 3500 and OH equivalent weights of from 300 to 250.

The epoxy resins are prepared by known methods, for example by reacting bisphenol A with epichlorohydrin. The resulting products have degrees of condensation of between 0 and 27, corresponding to a molecular mass of from 380 to 8000.

The cyclic amidines which can be employed as catalysts C) are described in DE-A 22 48 776 and 28 35 029. 2-Phenylimidazoline, 2-phenyl-4-methylimidazoline and 2,4-dimethylimidazoline are particularly suitable.

The catalysts may also be present in chemically blocked form in compounds. The starting compounds which ran be used for blocking with the cyclic amidines are any of the polyisocyanates of polyurethane chemistry, with isocyanate groups attached to aliphatic, cycloaliphatic and/or aromatic structures. For example, such polyisocyanates, especially diisocyanates, are described in Houben-Weyl, Methoden der organischen Chemie (Methods of organic chemistry), Vol. 14/2, pp. 61 to 70 or in Liebigs Annalen der Chemie 562, pp. 75 to 136. Particular preference is generally given to the aliphatic and cycloaliphatic diisocyanates which are readily obtainable industrially, such as 1,6-diisocyanatohexane (HDI), 3-methyl-1,5-diisocyanatopentane (MPDI), 2,2,4- and 2,4,4-trimethyldiisocyanatohexane (TMDI), 1-isocyanato-3-isocyanatomethyl-3,5,5-trimethylcyclohexane (IPDI) and 4,4'-diisocyanato-dicyclohexylmethane ($H_{12}$MDI) or any desired mixtures of these diisocyanates.

The term polyisocyanates refers for the purposes of this invention also to those which prior to blocking have been subjected to a reaction of molecular enlargement with the chain extenders which are customary in isocyanate chemistry, such as, water, polyols and polyamines. In such reactions the chain extender has been used in a deficit amount relative to the diisocyanate; in other words, the reaction product contained on average at least two NCO groups.

Also possible is molecular enlargement of the polyisocyanates mentioned by way of example, especially the simple diisocyanates and, in particular, those having isocyanate groups attached to aliphatic and/or cycloaliphatic structures, said enlargement taking place by dimerization, trimerization, carbodiimidization and allophanate formation and also biuretization, as is described, for example, in DE-A 29 29 150.

Blocking of the polyisocyanates takes place in analogy to the preparation of blocked polyisocyanates as described in DE-C 27 29 704.

Suitable binder components D) are compounds containing functional groups which in the course of the curing process can be reacted with isocyanate groups as a function of temperature and time, examples being hydroxyl, carboxyl, mercapto, amino, urethane and (thio)urea groups. As polymers it is possible to employ additional polymers, condensation polymers and polyaddition compounds.

Preferred components are primarily polyethers, polythioethers, polyacetals, polyesteramides, amino resins and their modification products with poly-functional alcohols, polyazomethines, polysulfonamides, acrylate resins, melamine derivatives, cellulose esters and cellulose ethers, and polyureas, but especially polyols, polyesters and polyurethanes.

Examples of suitable polyols are ethylene glycol, propylene 1,2- and 1,3-glycol, butylene 1,4- and 2,3-glycol, di-β-hydroxybutanediol, 1,6-hexanediol, 1,7-heptanediol, 1,8-octanediol, 1,12-dodecanediol, 1,18-octadecanediol, neopentylglycol, cyclohexanediol, bis(1,4-hydroxymethyl)cyclohexane, 2,2-bis(4-hydroxycyclohexyl)propane, 2,2-bis(4-(β-hydroxyethoxy)phenyl)-propane, 2-methyl-1,3-propanediol, 3-methyl-1,5-pentanediol, 2,2,4- and 2,4,4-trimethyl-1,6-hexanediol, glycerol, 1,1,1-trimethylolpropane, 1,1,1-trimethylolethane, 1,2,6-hexanetriol, 1,2,4-butanetriol, tris(β-hydroxyethyl)isocyanurate, pentaerythritol, mannitol, sorbitol and also diethylene glycol, triethylene glycol, tetraethylene glycol, dipropylene glycol, polypropylene glycols, polybutylene glycols, xylylene glycols and neopentylglycol hydroxypivalate. It is of course also possible to employ mixtures of two or more polyhydroxy compounds.

Carboxylic acids which are preferred for the preparation of polyesters may be aliphatic, cycloaliphatic, aromatic and/or heterocyclic in nature and may optionally be substituted by halogen atoms and/or unsaturated. Examples of these acids which may be mentioned are succinic, adipic, suberic, azelaic, sebacic, phthalic, terephthalic, isophthalic, trimellitic, pryomellitic, tetra-hydrophthalic, hexahydrophthalic, hexahydroterephthalic, di- and tetrachlorophthalic, endomethylenetetrahydrophthalic, dodecanedioic, dimeric fatty, glutaric, maleic and fumaric acids and—where obtainable—their anhydrides, dimethyl terephthalate and bis-glycol terephthalate.

Suitable polyhydric alcohol components for preparing the polyesters are the polyols mentioned above by way of example.

Polyesters of lactones or hydroxycarboxylic acids may likewise be employed.

When preparing the polyester polyols it is of course possible to employ any desired mixtures of the carboxylic acids mentioned by way of example, and/or their anhydrides or esters, or any desired mixtures of the exemplified polyhydric alcohols.

The hydroxyl-containing polyesters in the binder component D) preferably consists of two types having different characteristics. Preferred polyesters of type I have an OH functionality of from 2.0 to 5.0, preferably from 2.0 to 4.0, an OH number of from 20 to 200 mg of KOH/g, preferably from 30 to 150 mg of KOH/g, a molecular mass of from 1500 to 30,000, preferably from 2000 to 7000, a viscosity at 130° C. of <300,000 mPa.s, a melting point or flow point of up to about 230° C., and a glass transition temperature ($T_g$) of from −80° to 120° C. The morphology of the polyesters ranges from amorphous to crystalline.

Preferred hydroxyl-containing polyesters of type II have an OH functionality of from 2.0 to 5.0, an OH number of from 100 to 600 mg of KOH/g, preferably from 100 to 400 mg of KOH/g, and a molecular mass of from 100 to 2000.

The polyesters of both types may also possess acid numbers of up to about 35 mg of KOH/g.

The polyesters can be obtained in a known manner by condensation in an inert gas atmosphere at temperatures from 100° to 260° C., preferably from 130° to 220° C., in the melt or by an azeotropic procedure, as is described, for example, in Houben-Weyl, Methoden der Organischen Chemie, Vol. 14/2, 1–5, 21, 23, 40, 44, Georg Thieme Verlag, Stuttgart, 1963 or in C. R. Martens, Alkyd Resins, 51–59, Reinhold Plastics Appl. Series, Reinhold Publishing Comp., New York, 1961.

The polyurethanepolyols are reaction products of
(i) a polyisocyanate component comprising at least one organic polyisocyanate, with
(ii) a polyol component comprising at least one di- to hexahydric alcohol which may contain ester, ether and/or acrylate linkages.

Suitable polyisocyanates (i) include both aromatic and, in particular, (cyclo)aliphatic diisocyanates, such as 1,6-diisocyanatohexane (HDI), 3-methyl-1,5-diisocyanatopentane (MPDI), 2,2,4- and 2,4,4-trimethyldiisocyanatohexane (TMDI), 1-isocyanato-3-isocyanatomethyl-3,5,5-trimethylcyclohexane (IPDI) and 4,4'-diisocyanatodicyclohexylmethane ($H_{12}$MDI). Also possible is molecular enlargement of the polyisocyanates mentioned by way of example, said molecular enlargement being accomplished by dimerization, trimerization, carbodiimidization, allophanate formation and biuretization, as is described, for example, in DE-A 29 29 150. In the preparation of the polyurethanepolyols it is of course possible to employ any desired mixtures of the polyisocyanates mentioned by way of example.

Typical examples of polyhydric alcohols (ii) without additional functional groups are, for example, ethylene glycol, propylene 1,2- and 1,3-glycol, butylene 1,4- and 2,3-glycol, di-β-hydroxybutanediol, 1,6-hexanediol, 1,7-heptanediol, 1,8-octanediol, 1,12-dodecanediol, 1,18-octadecanediol, neopentylglycol, cyclohexanediol, bis(1,4-hydroxymethyl)cyclohexane, 2,2-bis(4-hydroxycyclohexyl)propane, 2,2-bis(4-(β-hydroxyethoxy)phenyl)-propane, 2-methyl-1,3-propanediol, 3-methyl-1,5-pentanediol, 2,2,4- and 2,4,4-trimethyl-1,6-hexanediol, glycerol, 1,1,1-trimethylolpropane, 1,1,1-trimethylolethane, 1,2,6-hexanetriol, 1,2,4-butanetriol, tris(β-hydroxyethyl)isocyanurate, pentaerythritol, mannitol, sorbitol and also diethylene glycol, triethylene glycol, tetraethylene glycol, dipropylene glycol, polypropylene glycols, polybutylene glycols, xylylene glycols and neopentylglycol hydroxypivalate. It is of course also possible to employ mixtures of two or more polyhydroxy compounds.

Examples of suitable polyesterpolyols (ii) are, in particular, the reaction products, which are known per se in polyurethane chemistry, of polyhydric alcohols of the abovementioned type with polycarboxylic acids. Suitable polycarboxylic acids may be aliphatic, cycloaliphatic, aromatic and/or heterocyclic in nature and may optionally be substituted by halogen atoms and/or unsaturated. Examples of these acids which may be mentioned are succinic, adipic, suberic, azelaic, sebacic, phthalic, terephthalic, isophthalic, trimellitic, pryomellitic, tetrahydrophthalic, hexahydrophthalic, hexahydroterephthalic, di- and tetrachlorophthalic, endomethylenetetrahydrophthalic, dodecanedioic, dimeric fatty, glutaric, maleic and fumaric acids and—where obtainable—their anhydrides, dimethyl terephthalate and bis-glycol terephthalate. Polyesters in the form of lactones or hydroxycarboxylic acids can likewise be employed. For the preparation of the polyesterpolyols, it is of course possible to employ any desired mixtures of the polyhydric alcohols mentioned by way of example or any desired mixtures of the carboxylic acids mentioned by way of example, and/or their anhydrides or esters.

Suitable polyetherpolyols (ii) are the ethoxylation and/or propoxylation products, known per se from polyurethane chemistry, of appropriate divalent to tetravalent starter molecules, for example water, ethylene glycol, propylene 1,2- and 1,3-glycol, 1,1,1-trimethylolpropane, glycerol and/or pentaerythritol.

The polyhydroxypolyacrylates (ii) comprise copolymers, known per se, of simple esters of acrylic acid and/or methacrylic acid and optionally styrene, with hydroxyalkyl esters of these acids being used in order to introduce the hydroxyl groups, examples of such esters being the 2-hydroxyethyl, 2-hydroxypropyl and 2-, 3- and 4-hydroxybutyl esters.

The polyhydroxypolyesters as described above, polyhydroxypolyethers and polyhydroxypolyacrylates generally have a hydroxyl number of from 20 to 200 mg of KOH/g, preferably from 50 to 130 mg of KOH/g, based on 100% products.

The polyurethanepolyols are preferably prepared in inert solvents, for example ketones, at temperatures from 20° to 900° C. In this context the amounts of the reactants generally correspond to an NCO/OH ratio of from 1:1.4 to 1:15.

The polyols and hydroxyl-containing polyesters and polyurethanes mentioned by way of example can be mixed with one another in any desired proportions and can be reacted with the hardener component A), binder component B) and the catalysts C).

In the course of the preparation of the novel adhesives it is possible, if required, for the additives and auxiliaries which are customary in the adhesive sector, such as catalysts, adhesion promoters, adhesive resins, leveling agents, fillers, pigments, dyes, UV stabilizers and antioxidants, to find application.

For the preparation of the novel PU adhesives, the hardener component A) is either homogenized in an inert solvent, for example acetone or methyl ethyl ketone, or after milling is mixed and homogenized in the melt, in both cases together with the hydroxyl-containing polymers B) and D) and with the catalysts for polymerizing the epoxide groups C), and also, optionally, with further auxiliaries and additives E). In the case of homogenization in a solvent, the solvent is removed by distillation in vacuo. The resulting product is then ground using a mill to a particle size of less than 500 µm. Homogenization in the melt can take place in suitable apparatus, for example heatable compounders, but preferably by extruding, in the course of which an upper temperature limit of 180° C. should not be exceeded. The compounded or extruded mass is cooled to room temperature, comminuted appropriately and ground using a mill to less than 500 µm.

The content of cyclic amidine is generally from 1 to 10% by mass, preferably from 2 to 8% by mass, based on the sum of resin and hardener. The amount of catalyst is chosen such that the content of cyclic amidine is sufficient for catalytic curing of EP-resin (polymerization of epoxide groups). Simultaneous crosslinking of the hydroxyl-containing compounds with at curing temperature deblocked polyisocyanates is reached. At this urethane-reaction the epoxide groups keep intact.

Application of the one-component adhesive to the substrates which are to be bonded may take place, for example, by sieving, electrostatic powder spraying, fluidized-bed sintering, electrostatic fluidized-bed sintering, or melting. Following application of the novel adhesive formulation to the clean surfaces of the parts to be joined, the bond is fixed optionally, for example, by means of appropriate tools or a weight. Curing of the coated workpieces takes place at from 150° to 220° C. over a period of from 60 minutes to 4 minutes, preferably at from 160° to 200° C. over a period of from 30 minutes to 6 minutes.

The novel resin/hardener systems can be employed, for example, as coating compositions for various substrates or, preferably, as adhesive, especially as one-pack PU adhesives for bonding a wide variety of materials, for example metals, light metals, but also nonmetallic materials, such as glass, ceramic or plastic. The substrates used must be resistant to heat.

The novel heat-curing PU adhesives give rise to bonds of excellent thermal durability in accordance with the tensile shear test coupled with adjustable flexibility. The adhesives are extremely advantageous from an ecological viewpoint since they are solvent-free and do not release elimination products in the course of curing. Moreover, the novel coatings are distinguished by outstanding resistance toward aggressive solvents, such as methyl ethyl ketone, for example.

The subject-matter of the invention is illustrated in more detail below with reference to examples.

The abbreviations used in the examples have the following meanings:

| | | |
|---|---|---|
| Aa | = | Adipic acid |
| DMPA | = | Dimethylolpropionic acid |
| HD | = | 1,6-Hexanediol |
| IPA | = | Isophthalic acid |
| NPG | = | Neopentylglycol (2,2-dimethyl-1,3-propanediol) |
| P | = | 1,5-Pentanediol |
| TMHD | = | Trimethylhexanediol |
| TMP | = | 1,1,1-Trimethylolpropane |

A) Preparation of the Polyaddition Products containing Hydroxyl and Uretdione Groups The polyaddition products containing hydroxyl and uretdione groups are produced by a known method. The physical and chemical characteristics of a compound used by way of example as hardener, and the molar compositions thereof, are summarized in Table 1.

The IPDI-uretdione prepared by a known method as an example of uretdiones has the following NCO contents:

| free: | 16.8 to 18.5% by mass |
|---|---|
| total: | 37.5 to 37.8% by mass |

The chain extender given by way of example, produced from 1 mol of adipic acid and 2 mol of neopentylglyrol, has an OH number of 335±15 mg of KOH/g and a viscosity at 25° C. of about 1500 mPa.s.

TABLE 1

Composition of an Exemplary Polyaddition Product Containing Hydroxyl and Uretdione Groups

| | Composition [mol] | | | Chemical and Physical Characteristics | | | |
|---|---|---|---|---|---|---|---|
| | | | | NCO content [% by mass] | | | Glass Transition |
| Example | IPDI Uretdione | Diols | Chain Extender | free | total | Melting Range [°C.] | Temperature [°C.] |
| A) 1) | 7 | 6.75P | 1.25 Aa/NPG | <0.1 | 13.3 | 104–115 | 85 |

B) Hydroxyl-containing Compounds
Table 2 below gives an overview of the polyols, hydroxyl-containing polyester and polyurethanes used to formulate PU adhesives.

TABLE 2

Hydroxyl-containing Compounds Used

| | | | Chemical and Physical Characteristics | | |
|---|---|---|---|---|---|
| Example | Manufacturer/ Country | Name | OH number [mg of KOH/g] | Acid number [mg of KOH/g] | Melting Range [°C.] |
| B) 1 | Shell/FRG | Epikote ® 1004 | 185 | 0 | 90–100 |
| B) 2 | Shell/FRG | Epikote ® 1007 | 193 | 0 | 120–130 |
| B) 3 | Shell/FRG | Epikote ® 1009 | 216 | 0 | 140–155 |
| B) 4 | Hüls/FRG | DYNACOLL ® 7130 | 31–39 | <2 | — |
| B) 5 | Hüls/FRG | Polyesterpolyol[1] | 104 | <1 | — |
| B) 6 | Hüls/FRG | Polyurethanepolyol[2] | 76 | 15 | — |

[1]IPA/HD/TMP/TMHD (7:5:2:1),
[2]IPDI/trimeric IPDI/TMP/DMPS/Oxyester T 1136 (Hüls AG) (2:1:2:1:2); the molar composition is indicated in brackets C) Polyurethane Adhesives Preparation of a chemically bound catalyst 2-Phenylimidazoline is added at a temperature of about 50° C. to a solution in acetone of isophorone diisocyanate (IPDI) and dibutyltin dilaurate (0.05% by mass based on solids). The mixture is stirred until the NCO content has fallen to below 0.5% by mass. The solvent is removed in vacuo.

General preparation procedure for the novel adhesives in solvent

The polyaddition product containing hydroxyl and uretdione groups, the hydroxyl-containing compounds, 2-phenylimidazoline (Example C) 1) and 2-phenylimidazoline-blocked isophorone diisocyanate (Example C) 2), as catalysts for polymerizing the epoxide groups, and optionally auxiliaries and additives are dissolved in an inert solvent such as, for example, acetone. After a homogeneous solution has been obtained, the solvent is removed in vacuo, the solid is comminuted and the comminuted solid is ground in a mill to a particle size <500 μm. This is followed by drying of the substance to constant weight.

Application of novel adhesives

The novel adhesive formulations are applied through a 100 mm sieve to degreased and roughened standard steel panels (St 1405).

Alternatives to this are electrostatic powder spraying, fluidized-bed sintering and electrostatic fluidized-bed sintering, and melting or partial melting of the compounds.

The bonds are produced in accordance with DIN EN 1465. The tensile shear strengths of these metal bonds, cured at different temperatures in a convection oven, and the tensile sheer strengths of the bonds following storage in methyl ethyl ketone (MEK), are listed in Table 3. For illustration, the comparison examples, of bonds containing no catalyst to polymerize the epoxide groups, are listed alongside.

TABLE 3

Metal Bonds (DIN EN 1465) With the Novel Hardener/Resin Mixtures

| | Adhesive Composition | | | | | 23° C. | |
|---|---|---|---|---|---|---|---|
| Example | NCO Equivalent of Hardener A) 1 | OH Equivalent of Resin | Catalyst [% by Mass Based on Resin/Hardener] | 23° C. | 100° C. | 1 d Storage in MEK | 7 d Storage in MEK |
| C) 1 | 1 | 3 B) 1 | — | 19 | 10 | 16 | 13 |
| C) 2 | 1 | 3 B) 1 | 2.0 C) 1 | 16 | 10 | 14 | 11 |
| C) 3 | 1 | 3 B) 1 | 2.0 C) 2 | 21 | 7 | 19 | 19 |
| C) 4 | 1 | 3 B) 1 | 5.9 C) 2 | 16 | 12 | 16 | 15 |

TABLE 3-continued

Metal Bonds (DIN EN 1465) With the Novel Hardener/Resin Mixtures

| | Adhesive Composition | | | | | | |
|---|---|---|---|---|---|---|---|
| | | | Catalyst [% by | | | 23° C. | |
| Example | NCO Equivalent of Hardener A) 1 | OH Equivalent of Resin | Mass Based on Resin/Hardener] | 23° C. | 100° C. | 1 d Storage in MEK | 7 d Storage in MEK |
| C) 5 | 1 | 3 B) 2 | — | 19 | 12 | 17 | 13 |
| C) 7 | 1 | 3 B) 2 | 2.0 C) 2 | 18 | 9 | 16 | 16 |
| C) 8 | 1 | 3 B) 2 | 5.9 C) 2 | 17 | 9 | 16 | 16 |
| C) 9 | 1 | 3 B) 3 | — | 18 | 12 | 15 | 14 |
| C) 11 | 1 | 3 B) 3 | 2.0 C) 2 | 16 | 8 | 14 | 14 |
| C) 12 | 1 | 3 B) 3 | 5.9 C) 2 | 16 | 9 | 14 | 13 |
| C) 13 | 1 | 1 B) 4/B) 1[1)] | — | 21 | 8 | 16 | 14 |
| C) 14 | 1 | 1 B) 4/B) 1[1)] | 2.0 C) 2 | 19 | 7 | 14 | 13 |
| C) 15 | 1 | 1 B) 5/B) 1[1)] | — | 21 | 6 | 16 | 15 |
| C) 16 | 1 | 1 B) 5/B) 1[1)] | 2.0 C) 2 | 19 | 8 | 17 | 17 |
| C) 17 | 1 | 1 B) 6/B) 1[1)] | — | 22 | 11 | 18 | 18 |
| C) 18 | 1 | 1 B) 6/B) 1[1)] | 2.0 C) 2 | 17 | 6 | 16 | 16 |

[1)]Polyols Ratio 50:50% by mass

Obviously, numerous modifications and variations of the present invention are possible in light of the above teachings. It is therefore to be understood that within the scope of the appended claims, the invention may be practiced otherwise than as specifically described herein.

The disclosure of German priority patent application 196 328 327.2, filed Jul. 13, 1996, is hereby incorporated by reference.

What is claimed as new and desired to be secured by Letters Patent of the United States is:

1. A heat-curing adhesive composition which comprises a mixture of components

A) a hardener component comprising at least one polyaddition product containing hydroxyl and uretdione groups, B) a binder component comprising at least one 1,2-epoxide compound having more than one 1,2-epoxide group and one or more hydroxyl groups in the molecule, C) at least one catalyst for polymerizing epoxide groups, and optionally D) further hydroxyl-containing compounds.

2. An adhesive composition as claimed in claim 1, wherein the hardener component A is obtained by reacting at least one of (i) uretdiones based on polyisocyanates having at least two free isocyanate groups, and at least one of (ii) isocyanate-reactive, difunctional and optionally monofunctional compounds.

3. An adhesive composition as claimed in claim 2, wherein the polyisocyanate comprises an aliphatic and/or cycloaliphatic diisocyanate.

4. An adhesive composition as claimed in claim 2, wherein the polyisocyanate comprises a uretdione of isophorone diisocyanate (IPDI).

5. An adhesive composition as claimed in claim 2, wherein the isocyanate-reactive compound comprises a diol and/or chain extender, and optionally a monoalcohol and/or a monoamine.

6. An adhesive composition as claimed in claim 1, wherein the binder component B comprises a 1,2-epoxide compound based on bisphenol A and epichlorohydrin, having a degree of condensation of between 0 and 27, corresponding to a molecular mass of between 380 and 8000.

7. An adhesive composition as claimed in claim 1, wherein catalyst C comprises a cyclic amidine of the general formula

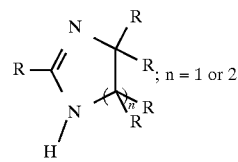

and/or a polyisocyanate blocked with said cyclic amidine, wherein radicals R are identical or different and are (cyclo)alkyls of 1 to 10 carbon atoms, aralkyls or aryls and where the content of cyclic amidine is from 1 to 10% by mass, based on the sum of A and B.

8. An adhesive composition as claimed in claim 1, wherein catalyst C comprises a cyclic amidine of the general formula

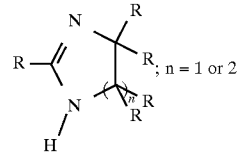

and/or a polyisocyanate blocked with said cyclic amidine, wherein radicals R are identical or different and are (cyclo)alkyls of 1 to 10 carbon atoms, aralkyls or aryls and where the content of cyclic amidine is from 2 to 8% by mass, based on the sum of A and B.

9. An adhesive composition as claimed in claim 7, wherein catalyst C comprises one or more of 2-phenylimidazoline, 2-phenyl-4-methylimidazoline and 2,4-dimethylimidazoline.

10. An adhesive composition as claimed in claim 7, wherein catalyst C comprises one or more of (1) the adducts of 1 mol of isophorone diisocyanate (IPDI) and 2 mol of 2-phenylimidazoline, (2) 1 mol of isophorone diisocyanate (IPDI) and 2 mol of 2-phenyl-4-methylimidazoline and (3) 1 mol of isophorone diisocyanate (IPDI) and 2 mol of 2,4-dimethylimidazoline.

11. An adhesive composition as claimed in claim 1, wherein hydroxyl-containing compounds D comprise at least one compound having a molecular mass of at least 60, an OH number of at least 20 mg of KOH/g and a hydroxyl functionality of at least 2.

12. An adhesive composition as claimed in claim 11, wherein hydroxyl-containing compounds D comprise at least one compound selected from polyols, polyesters, and polyurethanes.

13. An adhesive composition as claimed in claim 1, prepared by (1) homogenization of the components in an inert solvent which is removed after reaction has taken place, or (2) reaction without solvent in a compounder or extruder, at temperatures up to 150° C.

14. An adhesive component as claimed in claim 1, wherein the OH/NCO ratio is from 0.5 to 10.

15. An adhesive composition as claimed in claim 14, wherein the OH/NCO ratio is from 0.8 to 5.

16. An adhesive composition as claimed in claim 1, additionally containing, as a catalyst, at least one organotin compound in a concentration of from 0.01 to 1% by mass.

17. A method of bonding a solid material to a heat-resistant substrate comprising applying the composition of claim 1 between said solid material and substrate and curing said composition.

18. The method of claim 17, wherein the solid material is a metal.

19. A method comprising coating a substrate with the composition of claim 1 and heat-curing the coating.

20. The product made by the process of claim 19.

* * * * *

UNITED STATES PATENT AND TRADEMARK OFFICE
CERTIFICATE OF CORRECTION

PATENT NO. : 5,874,173
DATED : February 23, 1999
INVENTOR(S) : Andreas WENNING

It is certified that error appears in the above-identified patent and that said Letters Patent is hereby corrected as shown below:

On the title page, item [30], Foreign Application Priority Data should be:

--[30] FOREIGN APPLICATION PRIORITY DATA

Jul. 13, 1996 [DE] Germany ............... 196 28 327.2--

Signed and Sealed this

Seventeenth Day of August, 1999

Attest:

Q. TODD DICKINSON

Attesting Officer

Acting Commissioner of Patents and Trademarks